No. 783,918. PATENTED FEB. 28, 1905.
D. G. WYMAN.
HORSESHOE CALK MACHINE.
APPLICATION FILED NOV. 7, 1903.
3 SHEETS—SHEET 3.
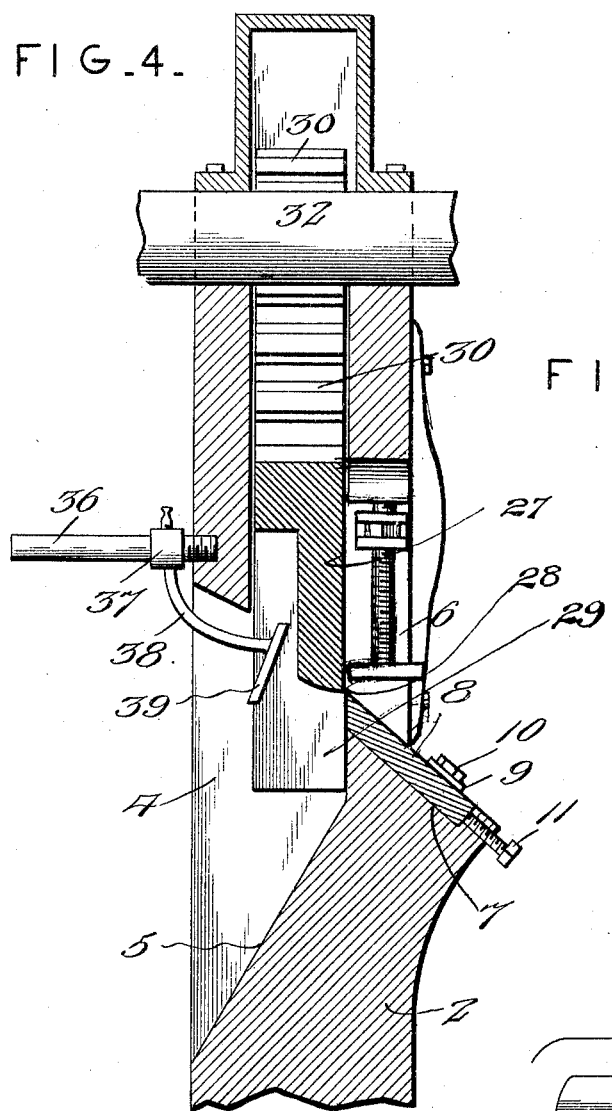
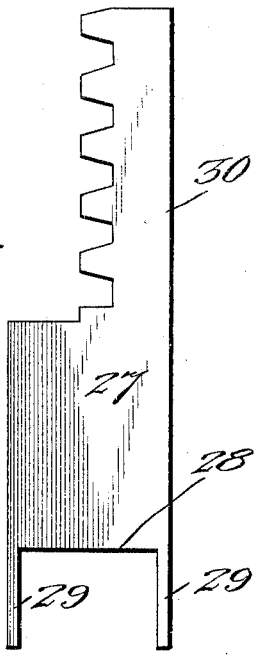
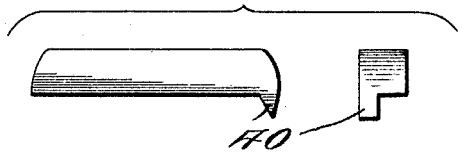
Witnesses
Harry L. Amer.
Hubert D. Lawson.
Inventor
David G. Wyman,
By Victor J. Evans
Attorney No. 783,918. Patented February 28, 1905.

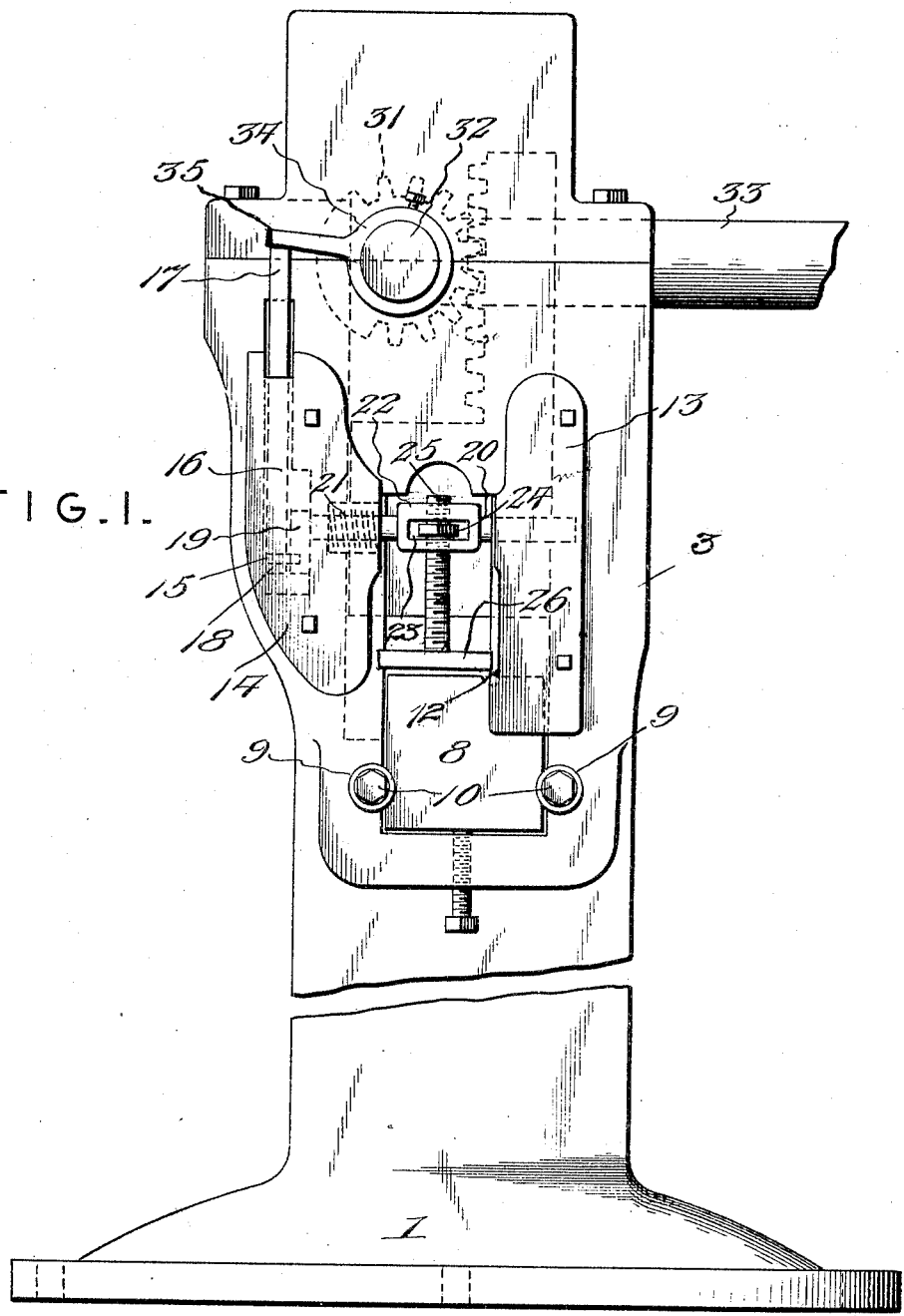

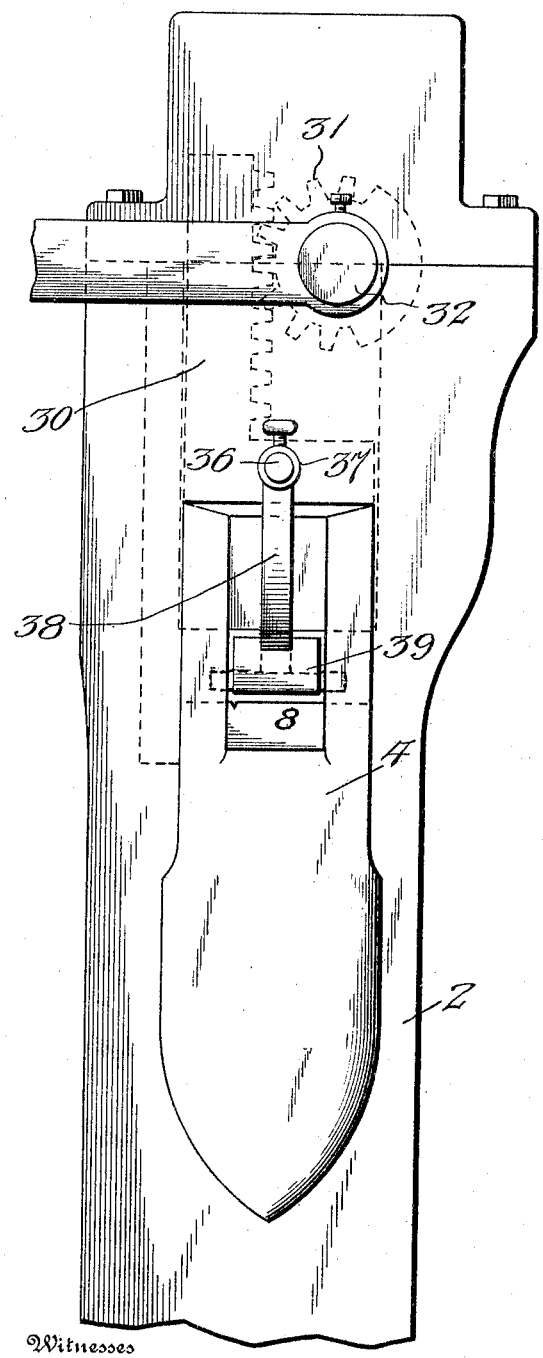
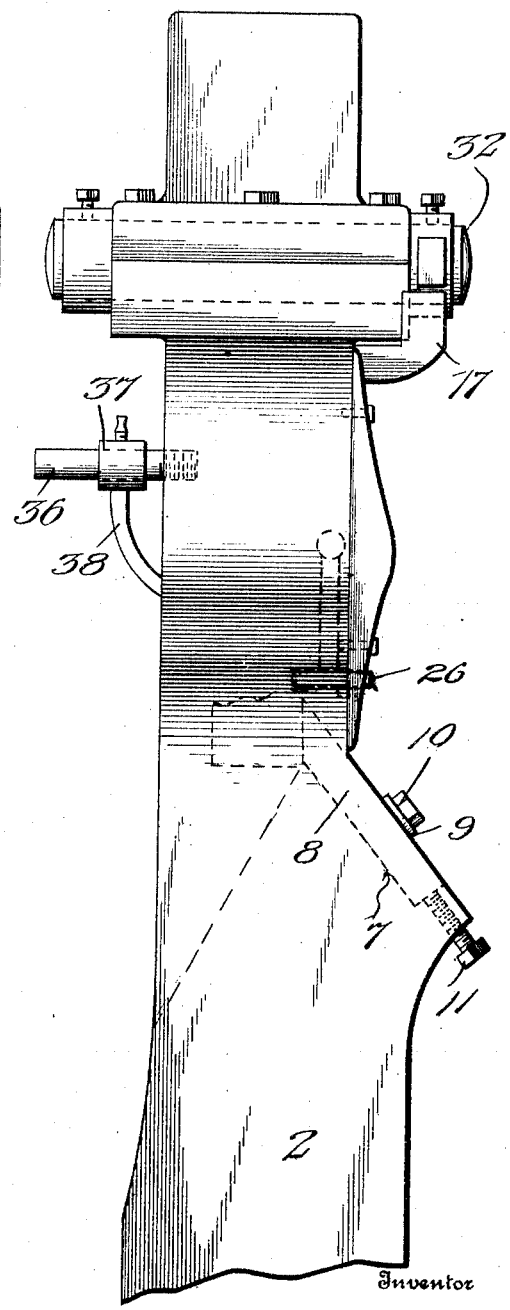

UNITED STATES PATENT OFFICE.

DAVID G. WYMAN, OF ORANGE, MASSACHUSETTS.

HORSESHOE-CALK MACHINE.

SPECIFICATION forming part of Letters Patent No. 783,918, dated February 28, 1905.

Application filed November 7, 1903. Serial No. 180,224.

*To all whom it may concern:*

Be it known that I, DAVID G. WYMAN, a citizen of the United States, residing at Orange, in the county of Franklin and State of Massachusetts, have invented new and useful Improvements in Horseshoe-Calk Machines, of which the following is a specification.

My invention relates to new and useful improvements in machines for manufacturing calks for horseshoes; and its object is to provide a strong and durable machine of this character which is of inexpensive construction and which is adapted to be operated manually and is, therefore, especially capable of use by blacksmiths.

The invention consists in providing an adjustable die, adjacent the working edge of which is arranged a shear which is adapted to be operated from a hand-lever by means of suitable mechanism interposed therebetween. Means are also employed for holding the metal upon the die after the shearing operation and for releasing the same when the shear is withdrawn therefrom.

The invention also consists in the further novel construction and combination of parts hereinafter more fully described, illustrated, and claimed.

In the accompanying drawings, Figure 1 is a front elevation of the machine constructed in accordance with my invention, the standard thereof being broken away. Fig. 2 is a rear elevation of the upper portion of the same. Fig. 3 is a side elevation thereof. Fig. 4 is a vertical section through the upper portion of the machine and taken from front to rear thereof. Fig. 5 is a front elevation of the shear detached. Fig. 6 is a side and end elevation of a calk adapted to be formed by this machine.

Referring to the figures by numerals of reference, 1 is a base adapted to be secured in place in any suitable manner, and extending from the base is a standard 2, having a head 3, the rear face of which is recessed, as shown at 4, the bottom 5 of said recess being inclined downward. An aperture 6 extends through the front face of the head and communicates with the recess 4, and the lower wall of this aperture is recessed, as shown at 7, for the reception of a die-plate 8, which is held in place by means of washers 9, which overlap the side edges of the die and are secured thereon by means of bolts 10. An adjusting-screw 11 is mounted within the head below and in alinement with the die, and this screw abuts against the lower end of the die and is adapted to be rotated to move the same longitudinally within the recess 7. The upper or working edge of the die is provided with a recess 12, preferably V-shaped in form, although, if desired, any other form of recess may be provided.

Face-plates 13 and 14 are secured to the front face of the head 3, and the face-plate 14 serves as a cover for a groove 15, which is formed within the front face of the head and contains a slide 16, having an L-shaped head 17, which projects from the upper end of the groove. The lower end of this slide is secured, by means of a wrist-pin 18, with a crank 19, arranged upon one end of a shaft 20, which extends across the aperture 6 and is inclosed by a coiled spring 21, the ends of which are secured to the head 3 and the shaft 20, respectively. The shaft 20 is enlarged at a point between its ends, as shown at 22, and this enlarged portion has a longitudinally-extending slot 23, in which is located a revoluble nut 24. This nut is mounted on a screw-threaded stem 25, which extends from the upper face of a clamping-plate 26. The plate 26 is normally lowered and in clamping position, it being held in contact with the face-plate 13 by the coiled spring 21.

A shear 27 is slidably mounted within the head, and the working face 28 thereof is adapted to contact with the inner end of the die 8. The lower portion of this shear is reduced in thickness, as shown in Fig. 4, and has guide-plates 29 extending from the sides thereof. A rack 30 is formed integral with the shear and projects from the upper end thereof, and this rack connects with a gear 31, which is secured to a shaft 32, revolubly mounted within the head and extending from front to rear thereof. A lever 33 is secured to one end of the shaft 32, and to the other end of said shaft is adjustably secured a ring 34, having an arm 35 projecting therefrom and adapted to contact with and compress the arm 17 of slide 16.

A stem 36 projects from the rear face of the head 3 at a point above the recess 4, and adjustably mounted upon this stem is a sleeve 37, from which depends an arm 38, which projects into the recess 4 and has a stop-plate 39 at its inner end.

When it is desired to form calks by means of the machine herein described, lever 33 is swung upward, and when near the end of such movement the arm 35 contacts with arm 17 and depresses it, thereby causing shaft 20 to rotate and swing the clamping-plate 26 away from the die 8. A bar of metal can then be placed in position upon the die. After this operation the lever 33 is drawn downward and arm 17 will be promptly released, and spring 21 will thus return the plate 26 into its lowered position, where it will clamp the metal bar upon the die and hold it during the further operation of the machine. The gear 31 will force the rack 30 downward as the lever 33 continues in its downward movement, and the shear 27 will also be moved downward, and said shear upon contacting with the metal will press it into the recess 12 and then cut it. The severed portion of the metal will fall upon the inclined face 5 of recess 4 and will be directed thereby into a suitable recess provided therefor. Subsequent to the shearing operation lever 33 is raised so as to remove the shear 27 from the die 8, and when the shear approaches the limit of its upward movement the plate 26 will be swung off the metal bar, which can then be pressed inward until the end thereof, which contains a spur formed by the metal pressed into the recess 12, is brought into contact with the stop-plate 39. The operation above described is then repeated.

In Fig. 6 I have shown one of the calks which may be formed by this machine, a spur 40 being formed by the metal which is pressed into the recess 12 by the shear.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of my invention.

Having thus fully described the invention, what is claimed as new is—

1. A machine of the character described, comprising a head having an aperture extending therethrough, a die adjustably mounted upon one wall of the aperture, a swinging clamping-plate supported within the aperture, a shear, a shaft revolubly mounted within the head, a rotating device upon the shaft for operating the shear, and means operated by the shaft for swinging the clamping-plate.

2. In a machine of the character described, the combination with a head having an aperture extending therethrough, and a die adjustably mounted upon one wall of the aperture; of a shear slidably mounted within the head, a shaft journaled within the head and extending transversely of the aperture, a clamping-plate adjustably mounted upon said shaft, an operating-shaft, and mechanism whereby the shear and clamping-plate are simultaneously operated by the rotation of the operating-shaft.

3. In a machine of the character described, the combination with a head having an aperture extending therethrough, and a die upon one wall of the aperture; of a shear slidably mounted within the head, a shaft journaled within the head and extending transversely of the aperture, a clamping-plate adjustably connected to the shaft, a slide within the head, means connecting the slide and shaft whereby rotary motion is imparted to the shaft from the slide, an operating-shaft, and mechanism whereby the shear and slide are simultaneously operated by the rotation of the operating-shaft.

4. In a machine of the character described, the combination with a head having an aperture therethrough, and a die upon one wall of the aperture; of a shear slidably mounted within the head, a rack extending from the shear, a shaft journaled within the head and extending transversely of the aperture, a clamping-plate adjustably connected to said shaft, a slide mounted within the head, a crank upon the shaft and pivoted to the slide, an operating-shaft, a gear thereon meshing with the rack, and an adjustable arm upon said shaft adapted to contact with the slide.

5. In a machine of the character described, the combination with a head having an aperture extending therethrough, and a die secured upon one wall of the aperture; of a shear slidably mounted within the head, a rack extending therefrom, a spring-controlled shaft journaled within the head and extending across the aperture, a clamping-plate adjustably secured to said shaft, a crank upon the shaft, a slide within the head and connected to the crank, an operating-shaft, a gear thereon meshing with the rack, an arm adjustably connected to the shaft and adapted to contact with the slide, and a stop-plate arranged within the aperture in the head.

In testimony whereof I affix my signature in presence of two witnesses.

DAVID G. WYMAN.

Witnesses:
 JAMES D. KIMBALL,
 ELISHA S. HALL.